United States Patent
Brill et al.

(10) Patent No.: US 10,853,846 B2
(45) Date of Patent: Dec. 1, 2020

(54) USER MODIFICATION OF CHARACTERISTICS USED FOR CONTENT SELECTION BY AN ONLINE SYSTEM

(71) Applicant: Facebook, Inc., Menlo Park, CA (US)

(72) Inventors: Jacob Andrew Brill, San Francisco, CA (US); Francisco Leonardo Franco Gonzalez, San Francisco, CA (US); Jane Francis, San Francisco, CA (US); Sarah Rotman Epps, Burlingame, CA (US); Gianluca Iannaccone, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 1670 days.

(21) Appl. No.: 14/473,981

(22) Filed: Aug. 29, 2014

(65) Prior Publication Data
US 2016/0063568 A1 Mar. 3, 2016

(51) Int. Cl.
G06Q 30/02 (2012.01)

(52) U.S. Cl.
CPC ..... *G06Q 30/0269* (2013.01); *G06Q 30/0277* (2013.01)

(58) Field of Classification Search
None
See application file for complete search history.

(56) References Cited

U.S. PATENT DOCUMENTS

2014/0136314 A1 * 5/2014 Kiet .................. G06Q 30/0242
705/14.41
2014/0244386 A1 * 8/2014 Mathur ............. G06Q 30/0255
705/14.53

* cited by examiner

*Primary Examiner* — Chrystina E Zelaskiewicz
*Assistant Examiner* — Michael J Cross
(74) *Attorney, Agent, or Firm* — Fenwick & West LLP

(57) ABSTRACT

Advertisement content presented to a user of an online system is presented along with an option allowing the user to view one or more reasons for presentation of the advertisement content to the user. If the user selects the option, based on targeting criteria associated with the advertisement content and characteristics associated with the user, the online system selects one or more characteristics of the user satisfying the targeting criteria and presents a description to the user identifying the selected one or more characteristics satisfying the targeting criteria. The online system may apply one or more rules based on user perception of characteristics when selecting the one or more characteristics included in the description. An option for the user to prevent use of the selected one or more characteristics when the online system subsequently selects advertisement content for the user is also presented with the description.

20 Claims, 4 Drawing Sheets

USER MODIFICATION OF CHARACTERISTICS USED FOR CONTENT SELECTION BY AN ONLINE SYSTEM

BACKGROUND

This disclosure relates generally to presentation of content by an online system, and more specifically to allowing an online system user to modify characteristics used by the online system to select content for presentation to the user.

An online system allows users to connect to and to communicate with other users of the online system. Users create profiles on an online system that are tied to their identities and include information about the users, such as interests and demographic information. The users may be individuals or entities such as corporations or charities. Content items are presented to various users by the online system to encourage users to interact with the online system.

But as the amount of content provided by the online system increases, users may be presented with an increasing amount of content in which the users have little interest. To provide users with content more likely to be relevant, content items may be associated with targeting criteria specifying characteristics of users eligible to be presented with the content item. This limits presentation of a content item to users having characteristics satisfying the targeting criteria. However, a conventional online system provides a user with limited ability to regulate use of its characteristics by the online system in selecting content for the user.

SUMMARY

An online system selects content items for presentation to a user of the online system based at least in part on characteristics of the user. For example, the online system selects advertisement content from one or more advertisement ("ad") requests for presentation to a user and presents selected advertisement content to the user. Each ad request includes advertisement content for presentation to users, targeting criteria identifying characteristics of users eligible to be presented with the advertisement content, and a bid amount specifying an amount of compensation received by the online system for presenting the advertisement content. To select advertisement content for presentation to the user, the online system retrieves characteristics associated with the user (e.g., demographic information, interests, actions performed by the user, connections between the user and other online system users, etc.) and compares the characteristics to targeting criteria included in various ad requests. Ad requests including at least a threshold number of targeting criteria satisfied by the characteristics associated with the user are identified as eligible for presentation to the user and included in a selection process performed by the online system. However, ad requests that do not include at least a threshold number of targeting criteria satisfied by characteristics associated with the user are not included in the selection process. Advertisement content associated with ad requests selected by the selection process is subsequently presented to the user.

To allow the user to regulate selection of advertisement content based on characteristics of the user, when advertisement content is presented to the user, the online system also presents an option for the user to view the reasons for presentation of the advertisement content. The option may be presented as text data or image data presented in conjunction with the advertisement content. If the online system receives a selection of the option to view reasons for presentation of the advertisement content, the online system identifies characteristics of the user matching targeting criteria included in the ad request that included the presented advertisement content. From the identified characteristics of the user, the online system selects one or more characteristics based on rules stores by the online system. For example, the online system determines a score associated with each identified characteristic that provides a measure of expected user comfort with use of the characteristic for selecting content and selects an identified characteristic based on the scores. In one embodiment, the online system selects the identified characteristic associated with a score indicating a highest expected user comfort with user of the characteristic to select content. The online system generates a description based on the selected one or more characteristics satisfying targeting criteria included in the ad request and presents the description to the user. For example, the description identifies the one or more selected characteristics, and may identify the targeting criteria satisfied by the one or more selected characteristics.

An option to prevent subsequent use of the selected one or more characteristics for selecting subsequent advertisement content for presentation to the user is included in the description presented to the user. If the online system receives an input indicating selection of the option or another input from the user to prevent use of the selected one or more characteristics for advertisement content selection, the online system does not identify subsequent ad requests including targeting criteria satisfied by the selected one or more characteristics as eligible for presentation to the user. The online system stores information associated with the selected one or more characteristics or with targeting criteria satisfied by the selected one or more characteristics to indicate that additional ad requests including targeting criteria satisfied by the selected characteristics are not eligible for presentation to the user. Additionally, the online system may also allow a user to view multiple characteristics associated with the user and compared to targeting criteria included in ad requests via an interface and to select characteristics from the interface authorized by the user to be compared to targeting criteria in ad requests and not authorized by the user to be compared to targeting criteria in ad requests.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
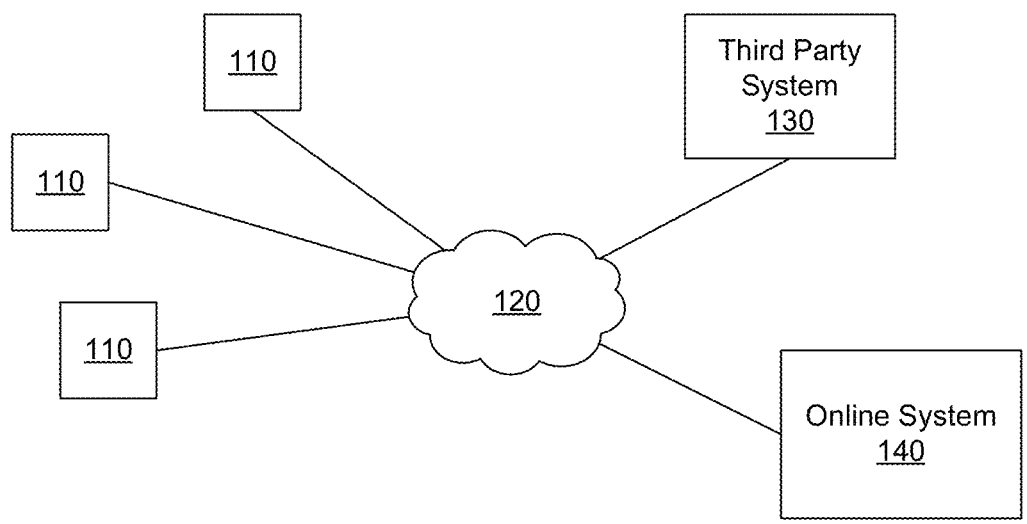
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
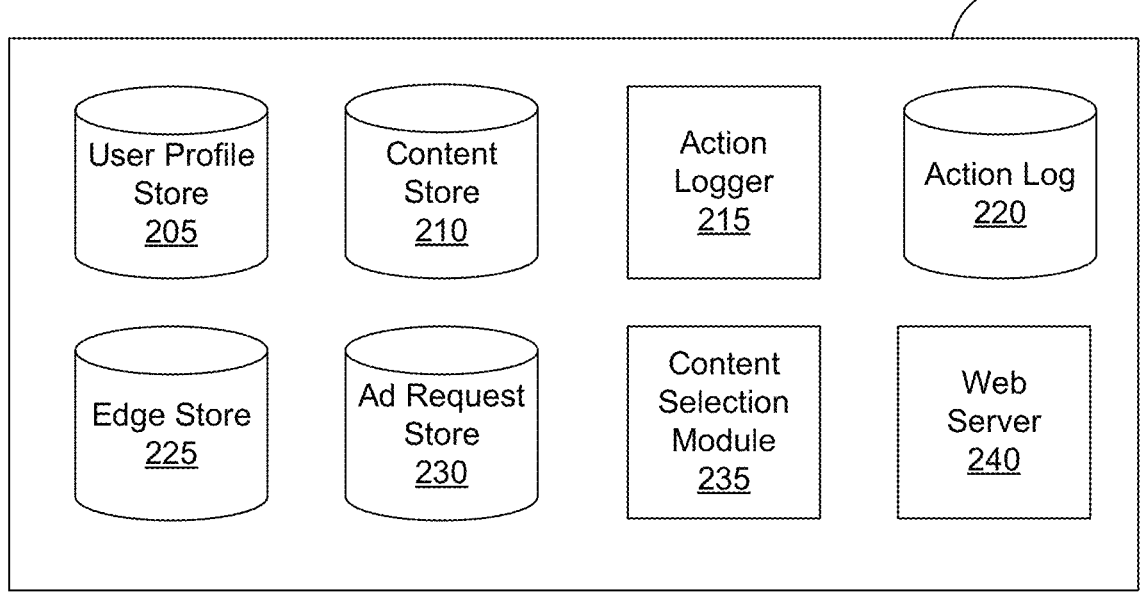
FIG. 2 is a block diagram of an online system, in accordance with an embodiment.

FIG. 2 is a block diagram of an architecture of the online system 140. For example, the online system 140 is a social networking system. The online system 140 shown in FIG. 2 includes a user profile store 205, a content store 210, an action logger 215, an action log 220, an edge store 225, an advertisement ("ad") request store 230, a content selection module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or another user in the online system 140 based on the actions performed by the user. A user's affinity may be computed by the online system 140 over time to approximate a user's interest in an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An advertisement request includes advertisement content and a bid amount. The advertisement content is text, image, audio, video, or any other suitable data presented to a user. In various embodiments, the advertisement content also includes a landing page specifying a network address to which a user is directed when the advertisement is accessed. The bid amount is associated with an advertisement by an advertiser and is used to determine an expected value, such as monetary compensation, provided by an advertiser to the social networking system 140 if the advertisement is presented to a user, if the advertisement receives a user interaction, or based on any other suitable condition. For example, the bid amount specifies a monetary amount that the social networking system 140 receives from the advertiser if the advertisement is displayed and the expected value is determined by multiplying the bid amount by a probability of the advertisement being accessed.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the social networking system 140. Targeting criteria may also specify interactions between a user and objects performed external to the social networking system 140, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with content from an advertisement request. As another example, targeting criteria identifies users having a connection to another user or object or having a particular type of connection to another user or object.

The content selection module 235 selects content items for presentation to a user of the online system 140 based at least in part on characteristics of the user. In one embodiment, the content selection module 235 selects advertisement content from one or more ad requests for presentation to a user and presents selected advertisement content to the user. To select advertisement content for presentation to the user, the content selection module 235 retrieves characteristics associated with the user from the user profile store 205, the action log 220, or the edge store 225 and compares the characteristics to targeting criteria included in various ad requests from the ad request store 230. Ad requests including at least a threshold number of targeting criteria satisfied by the characteristics associated with the user are identified as eligible for presentation to the user and included in a selection process performed by the content selection module 235. However, ad requests that do not include at least a threshold number of targeting criteria satisfied by characteristics associated with the user are not included in the selection process.

In one embodiment, the content selection module 235 selects ad requests for presentation to the user based at least in part on bid amounts associated with ad requests identified as eligible for presentation to the user. For example, the content selection module 235 determines an expected value to the online system 140 for presenting different ad requests identified as eligible for presentation to the user. The expected value for presenting an ad request is based on the bid amount included in the ad request and a likelihood of the user interacting with the ad request; for example, the expected value for presenting the ad request is a product of the bid amount included in the ad request and the likelihood of the user interacting with the ad request. In various embodiments, the content selection module 235 ranks ad requests identified as eligible for presentation to the user based on their associated expected values and selects ad requests having at least a threshold position in the ranking for presentation to the user. For example, ad requests having the highest positions in the ranking are selected for presentation to the user, so advertisement content included in the ad requests selected based on the ranking is presented to the user.

To allow the user to regulate selection of advertisement content based on characteristics of the user, when advertisement content is presented to the user, the content selection module 235 also presents an option for the user to view the reasons for presentation of the advertisement content. The option is presented as text data or image data presented in conjunction with the advertisement content. If the content selection module 235 receives a selection of the option to view reasons for presentation of the advertisement content, the content selection module 235 identifies characteristics of the user matching targeting criteria included in the ad request that included the presented advertisement content. From the identified characteristics of the user, the content selection module 235 selects one or more characteristics based on rules stores by the content selection module 235. For example, the content selection module 235 determines a score associated with each identified characteristic that provides a measure of expected user comfort with use of the characteristic for selecting content and selects an identified characteristic based on the scores. In one embodiment, the content selection module 235 selects the identified characteristic associated with a score indicating a highest expected user comfort with user of the characteristic to select content. The content selection module 235 generates a description based on the selected one or more characteristics satisfying targeting criteria included in the ad request and presents the description to the user. For example, the description identifies the one or more selected characteristics, and may identify the targeting criteria satisfied by the one or more selected characteristics. Selection of one or more characteristics and generation of the description is further described below in conjunction with FIG. 3.

An option to prevent subsequent use of the selected one or more characteristics for selecting subsequent advertisement content for presentation to the user is included in the description presented to the user. If the content selection module 235 receives an input indicating selection of the option or another input from the user to prevent use of the selected one or more characteristics for advertisement content selection, the content selection module 235 does not identify subsequent ad requests including targeting criteria satisfied by the selected one or more characteristics as eligible for presentation to the user. The content selection module 235 stores information associated with the selected one or more characteristics or with targeting criteria satisfied by the selected one or more characteristics to indicate that additional ad requests including targeting criteria satisfied by the selected characteristics are not eligible for presentation to the user. Additionally, the content selection module 235 may also allow a user to view multiple characteristics associated with the user and compared to targeting criteria included in ad requests via an interface and to select characteristics from the interface authorized by the user to be compared to targeting criteria in ad requests and not authorized by the user to be compared to targeting criteria in ad requests. User specification of characteristics for comparison to targeting criteria is further described below in conjunction with FIG. 3.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Modifying User Characteristics Used for Advertisement Selection

Figure 3:
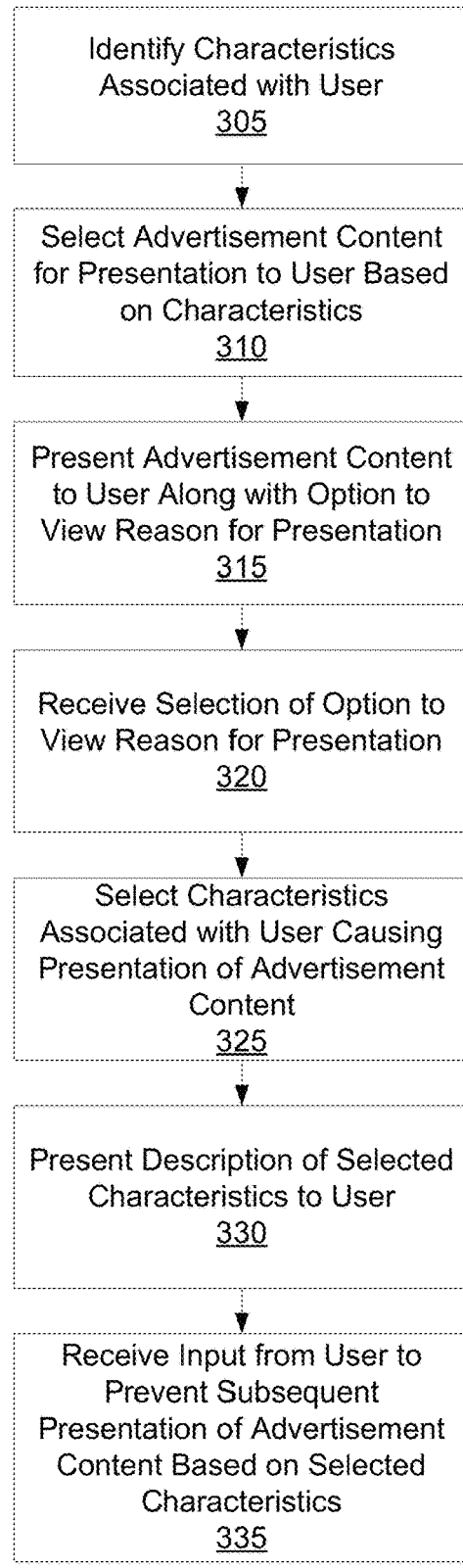
FIG. 3 is a flow chart of a method for modifying characteristics of a user of an online system used for selecting advertisement content presented to the user, in accordance with an embodiment.

FIG. 3 is a flow chart of one embodiment of a method for modifying characteristics of a user of an online system 140 used for selecting advertisement content presented to the user. In other embodiments, the method may include different and/or additional steps than those described in conjunction with FIG. 3. Additionally, in some embodiments, the method may perform the steps described in conjunction with FIG. 3 in different orders.

The online system 140 receives an advertisement ("ad") request from an advertiser including advertisement content and targeting criteria. As described above in conjunction with FIG. 2, the advertisement content is content presented to a user, and the targeting criteria identifies one or more characteristics of users eligible to be presented with the advertisement content included in the ad request. For example, a user associated with characteristics satisfying at least a threshold number of targeting criteria included in the ad request is eligible to be presented with the advertisement content, while another user that is not associated with characteristics satisfying at least the threshold number of targeting criteria is not eligible to be presented with advertisement content included in the ad request. The online system 140 stores the received ad request.

When the online system 140 identifies an opportunity to present an advertisement to a user of the online system 140, characteristics associated with the user by the online system 140 are identified 305 and compared to the targeting criteria included in the received ad request. For example, the online system 140 receives a request for one or more advertisements from a client device 110 associated with the user when the user views content via the client device 110. As another example, the online system 140 receives a request for one or more advertisements form a third party system 130 providing content including one or more slots or regions for advertisement content to a client device 110 for presentation to the user. Example characteristics associated with the user include information included in a user profile associated with the user (e.g., age, gender, location, occupation, interests, etc.), actions performed by the user and identified by the online system 140, or connections between the user and one or more additional users of the online system 140. Characteristics associated with the user may be identified 305 from information associated with the user by the online system 140 as well as information associated with the user by one or more third party systems 130.

The online system 140 compares identified characteristics to the targeting criteria included in the ad request to determine if the ad request is eligible for presentation to the user. For example, the online system 140 determines a characteristic of the user satisfies targeting criteria if the characteristic has a value matching a value specified by the targeting criteria or has a value within a range specified by the targeting criteria. In some embodiments, a characteristic of the user is determined to satisfy targeting criteria if the characteristic has a value specified by the targeting criteria or determined by the online system 140 to be similar to the targeting criteria. If at least a threshold number of the identified characteristics satisfy the targeting criteria, the ad request is included in a process that selects advertisement content for presentation to the user. In one embodiment, a bid amount included in the ad request is retrieved and used by the online system 140 to determine an expected value to the online system 140 for presenting the advertisement content in the ad request to the user. For example, the expected value of the ad request is based on a probability of the user interacting with the advertisement content included in the ad request and the bid amount associated with the ad request. In this example, the process for selecting advertisement content ranks multiple ad requests based on their associated expected values and selects ad requests having at least a threshold position in the ranking for presentation. Advertisement content from the selected ad requests is presented to the user.

The advertisement content included in the ad request is selected 310 for presentation to the user and is presented 315 to the user by the online system 140 if the ad request is selected. For example, the advertisement content from the ad request is communicated to a third party system 130 for presentation 315 in conjunction with content provided by the third party system 130. As another example, the advertisement content from the ad request is communicated from the online system 140 to a client device 110 for presentation to the user. In conjunction with the advertisement content, an option is also presented 315 for the user to view one or more reasons for presentation of the advertisement content. For example, the phrase "Why am I seeing this?" is presented 315 in conjunction with the advertisement content. However, any suitable information may be presented 315 as the option for the user to view one or more reasons for presentation of the advertisement content.

If the user selects the option to view one or more reasons for presentation of the advertisement content, the online system 140 receives 320 the selection and selects 325 one or more characteristics of the user causing determination of the ad request to be eligible for presentation to the user. In some embodiments, the online system 140 selects 325 one or more characteristics of the user that cause the ad request to be identified as eligible for presentation to the user automatically. The online system 140 determines the characteristics of the user satisfying the targeting criteria included in the ad request and selects 325 one or more of the characteristics of the user satisfying the targeting criteria included in the ad request. In one embodiment, the online system 140 ranks the one or more characteristics of the user satisfying the targeting criteria based on information associated with the characteristics. For example, information describing feedback received from various online system users describing perception of using various characteristics to select content is used to rank the characteristics of the user satisfying the ad request's targeting criteria. A characteristic having a maximum position in the ranking is selected 325 in one embodiment, or one or more characteristics having at least a threshold position in the ranking are selected 325 in other embodiments. As another example, a score is associated with each characteristic satisfying the ad request's targeting criteria is determined based on the information describing user feedback regarding user of different characteristics for selecting content, and one or more characteristics having at least a threshold score or a characteristic having a maximum (or a minimum) score are selected 325. In other embodiments, an operator of the online system 140 specifies one or more rules for selecting 325 the one or more characteristics. For example, the rules may provide a hierarchy of types of characteristics, with characteristics having at least a threshold position in the hierarchy selected 325 for presentation. In some embodiments, the operator of the online system 140 specifies rules that identify a hierarchy of types of characteristics based on a perception by the operator of how different types of characteristics provide information to a user about why the advertisement content was presented to the user. Types of characteristics with a higher position in the hierarchy may be determined by the operator to provide users with more descriptive information about reasons for presentation of ad content to the user than types of characteristics a lower position in the hierarchy. In some embodiments, a single characteristic is selected 325 for presentation.

A description of the selected one or more characteristics of the user is generated by the online system 140 and presented 330 to the user along with an option to prevent use of the selected one or more characteristics for selecting subsequent advertisement content to be presented to the user. For example, the targeting criteria satisfied by a selected characteristic of the user is presented 330 or a textual description of the targeting criteria satisfied by the selected characteristic of the user is presented 330. As another example, the targeting criteria and a value of the characteristic of the user satisfying the targeting criteria are presented 330 to the user. The description of the selected one or more characteristics may be presented 330 in conjunction with the advertisement content or may be presented in an interface separate from the interface in which the advertisement content is presented.

To prevent the online system 140 from using the selected one or more characteristics for selecting subsequent advertisement content to be presented to the user, the online system 140 receives 335 an input from the user. For example, the user selects the option presented along with the selected one or more characteristics, causing the online system 140 to receive 335 the input to prevent subsequent use of the selected one or more characteristics when identifying advertisement content eligible to be presented to the user. In response to receiving 335 the input, the online system 140 stores information associated with the selected one or more characteristics to prevent their use in subsequent advertisement content selection. For example, if the selected one or more characteristics satisfy targeting criteria included in an additional ad requests, after receiving 335 the input, the online system 140 determines the additional ad request is ineligible for presentation to the user. Hence, the online system 140 allows the user to easily regulate use of various characteristics of the user when selecting advertisement content for presentation to the user.

In some embodiments, the online system 140 presents the user with an option to modify characteristics of the user compared to targeting criteria included in ad requests. When the online system 140 receives a selection of the option to modify characteristics compared to targeting criteria, the online system 140 presents an interface including characteristics associated with the user and maintained by the online system 140. The option to modify characteristics compared to targeting criteria may be presented along with advertisement content or may be presented in conjunction with information from a user's user profile.

From the interface, the user provides input to the online system 140 indicating whether various characteristics may be compared to targeting criteria included in ad requests to identify ad requests eligible for presentation to the user. For example, the user selects characteristics that the online system 140 is authorized to compare to targeting criteria included in ad requests; the online system 140 compares the characteristics selected by the user to targeting criteria included in ad requests but does not compare characteristics not selected by the user to targeting criteria included in ad requests. Alternatively, the user selects characteristics that the online system 140 is not authorized to compare to targeting criteria included in ad requests; the online system 140 compares the characteristics not selected by the user to targeting criteria included in ad requests but does not compare characteristics selected by the user to targeting criteria included in ad requests. Additionally, the interface identifying characteristics may identify additional characteristics for the user to provide to the online system 140 for association with the user. The additional characteristics may be determined based on collaborative filtering, correlation between a characteristic associated with the user and characteristics associated with other users also associated with the characteristic, based on characteristics satisfying additional targeting criteria included in ad requests also including targeting criteria satisfied by a characteristic of the user, or any other suitable information. The user may select an additional characteristic for the online system 140 to maintain in association with the user, allowing the additional characteristic to be compared to targeting criteria associated with ad requests or with other content items.

Example User Interfaces

Figure 4A:
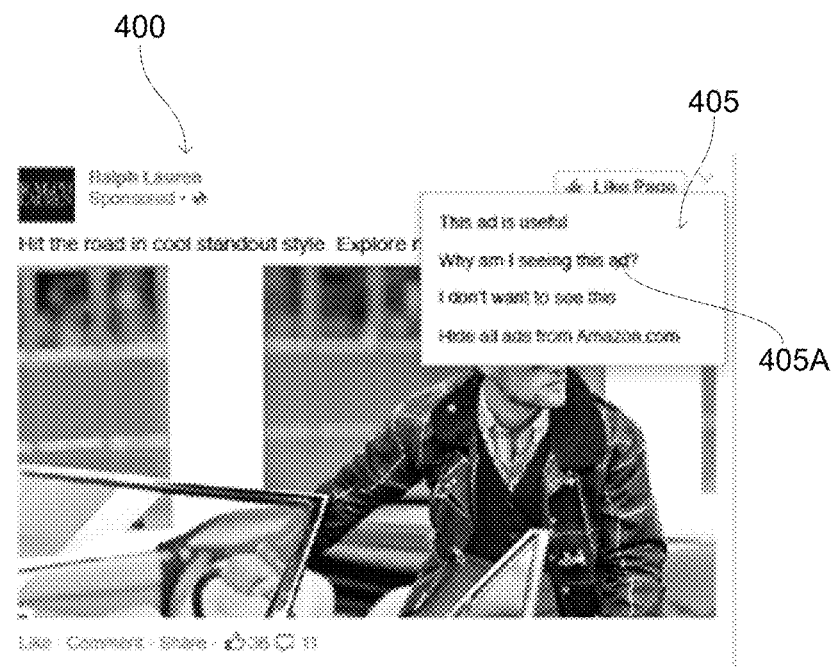
FIGS. 4A and 4B are example user interfaces presented to an online system user to modify characteristics of the user authorized to be used for selecting content, in accordance with an embodiment.
Figure 4B:
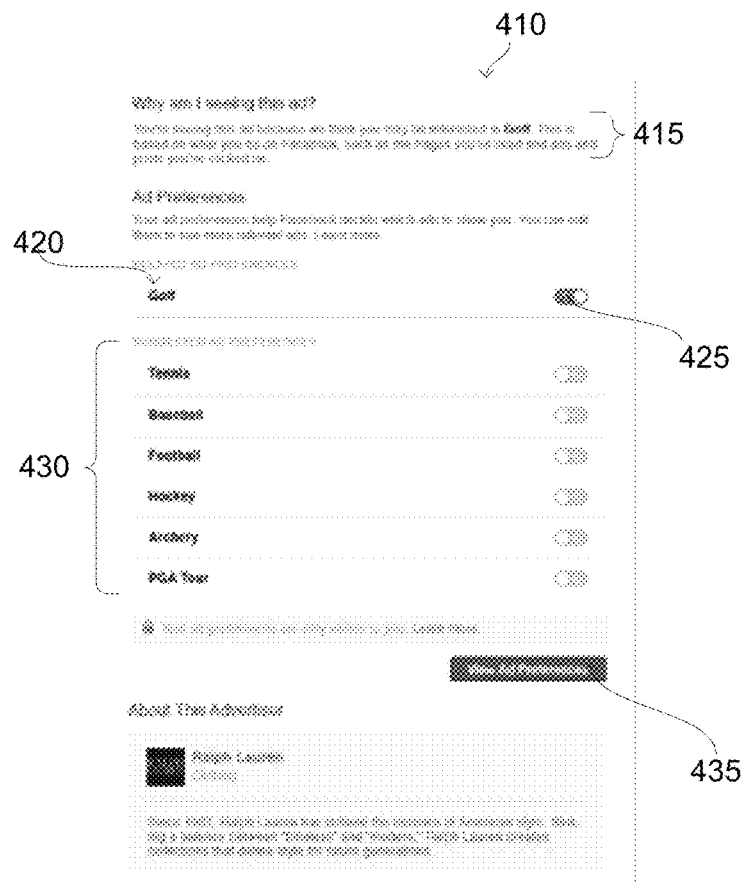

FIGS. 4A and 4B are example user interfaces presented to an online system user to modify characteristics of the user authorized to be used for selecting content. In the example of FIG. 4A, advertisement content 400 is presented along with various options 405 to present information associated with the advertisement content 400 or to provide feedback to the online system 140 regarding the advertisement content 400. Included in the options 405 is an option 405A to view one or more reasons the advertisement content 400 is presented to the user. Other options 405 presented to the user may include an option to indicate to the online system 140 that the advertisement content 400 is useful to the user, an option to hide the advertisement content 400 from presentation to the user, and an option to prevent presentation of additional advertisement content associated with an advertiser or entity associated with the advertisement content 400. In various embodiments, the options 405 may be presented in response to a user interaction with the advertisement content 400 (e.g., accessing a specific interface element or portion of the advertisement content 400) or may be automatically presented to the user by the online system 140.

Referring to FIG. 4B, if the user selects the option 405A to view one or more reasons the advertisement content 400 was presented, an interface 410 describing the one or more reasons is presented. The interface 410 may be presented in conjunction with the advertisement content 400 or may be presented in place of the advertisement content 400. The interface 410 includes a description 415 identifying a characteristic of the user satisfying targeting criteria associated with the advertisement content 400, with the characteristic selected as described above in conjunction with FIG. 3. Additionally, the interface presents an option allowing the user to prevent subsequent user of the characteristic identified in the description 415 by the online system 140 to select content for the user. In the example of FIG. 4B, the option includes an identification 420 of the characteristic and an interface element 425 having a state indicating the characteristic is authorized for use in selecting content and having an alternative state indicating the characteristic is prevented from being used in selecting content. Interacting with the interface element 425 allows the user to communicate information to the online system 140 specifying whether the characteristic is authorized for use in selecting content for presentation to the user or whether the characteristic is prevent from use in selecting subsequent content for presentation to the user.

In the example of FIG. 4B, the interface 410 also identifies various additional characteristics 430 for the user to identify to the online system 140 for association with the user and use in selecting content for the user. The additional characteristics 430 may be determined based on collaborative filtering, correlation between a characteristic associated with the user and characteristics associated with other users also associated with the characteristic, based on characteristics satisfying additional targeting criteria included in ad requests also including targeting criteria satisfied by a characteristic of the user, or any other suitable information. The user may select an additional characteristic 430 by interacting with an interface element presented in conjunction with each additional characteristic 430 to maintain in association with the user, allowing the additional characteristic to be compared to targeting criteria associated with ad requests or with other content items.

Figure 5:
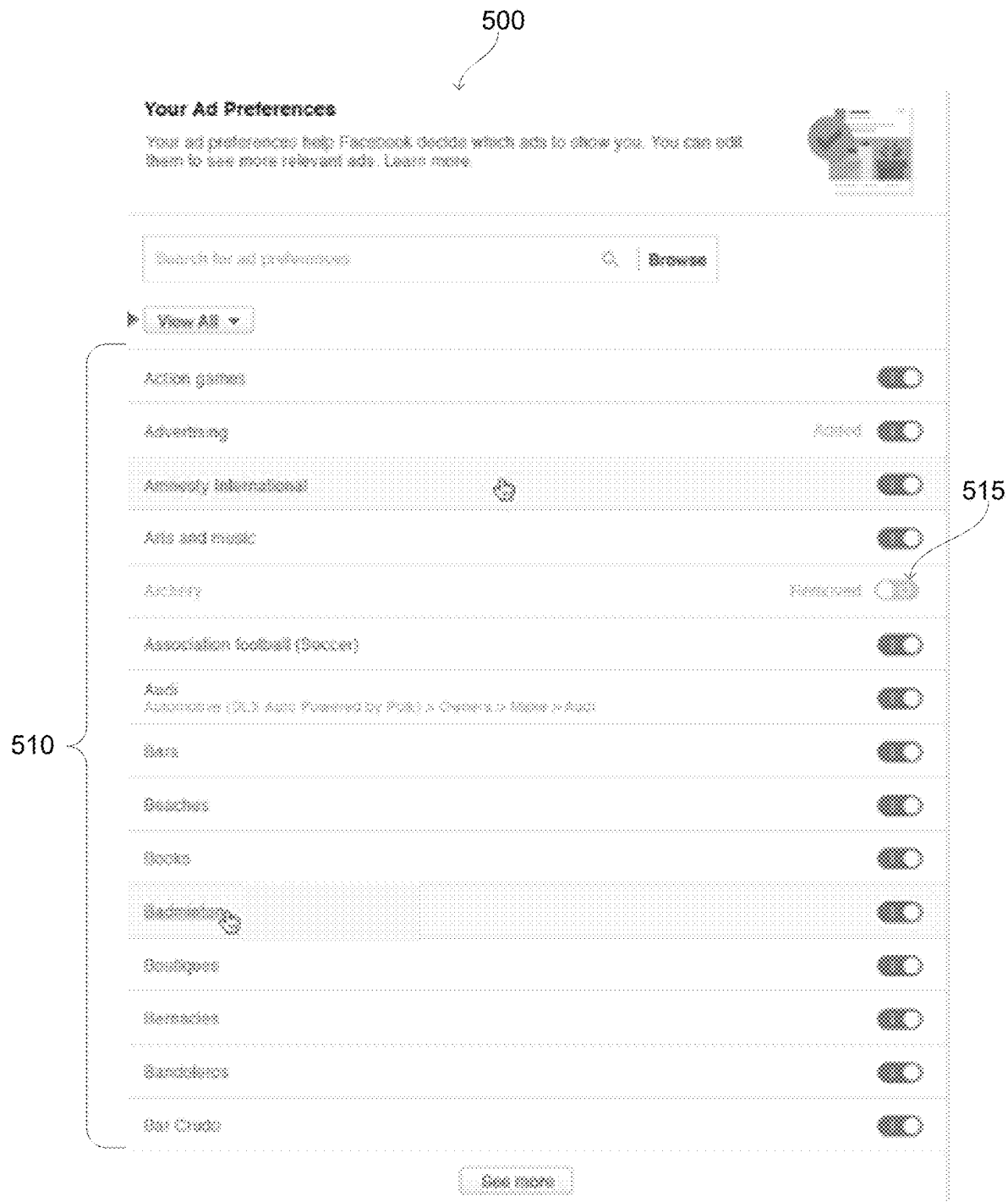
FIG. 5 is an example interface identifying characteristics associated with the user by the online system and options for a user to modify characteristics of the user authorized for use in selecting content, in accordance with an embodiment.

The interface 410 shown in FIG. 4B also includes an option 435 to modify characteristics of the user compared to targeting criteria included in ad requests. When the online system 140 receives a selection of the option to modify characteristics compared to targeting criteria, the online system 140 presents an interface including characteristics associated with the user and maintained by the online system 140. FIG. 5 shows an example interface 500 identifying characteristics 510 associated with the user by the online system 140. Each characteristic 510 is associated with an interface element 515 having a state indicating the characteristic is authorized for use in selecting content and having an alternative state indicating the characteristic is prevented from being used in selecting content. Interacting with the interface element 515 allows the user to communicate information to the online system 140 specifying whether the characteristic is authorized for use in selecting content for presentation to the user or whether the characteristic is prevent from use in selecting subsequent content for presentation to the user.

From the interface 500, the user provides input to the online system 140 indicating whether various characteristics 510 may be compared to targeting criteria included in ad requests to identify ad requests eligible for presentation to the user. For example, the user interacts with an interface element 515 associated with a characteristic 510 to identify that the online system 140 is authorized to compare to targeting criteria included in ad requests. The online system 140 compares the characteristics 510 identified as authorized to be compared to targeting criteria included in ad requests but does not compare characteristics 510 not selected by the user to targeting criteria included in ad requests (i.e., characteristics 510 presented along with an interface element 515 in a state indicating the characteristics 510 are not authorized to be compared to targeting criteria). In some embodiments, the interface 500 allows the user to group different characteristics 510 based on a type associated with the characteristics 510 to allow the user to view different groups of characteristics 510.

SUMMARY

The foregoing description of embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of embodiments is intended to be illustrative, but not limiting, of the scope of the patent rights, which is set forth in the following claims.

What is claimed is:

1. A method comprising:

receiving, at an online system, an advertisement ("ad") request including advertisement content and targeting criteria, the targeting criteria identifying one or more characteristics of users of the online system eligible to be presented with the advertisement content;

identifying an opportunity to present advertising to a user of the online system;

identifying characteristics associated with the user by the online system;

selecting the advertisement content included in the ad request for presentation to the user based on the identified characteristics satisfying at least a threshold amount of the targeting criteria included in the ad request;

selecting one or more characteristics of the user satisfying the targeting criteria included in the ad request;
generating a display menu that comprises:
1) an identification of the selected one or more characteristics, and
2) an option to prevent subsequent presentation of additional advertisement content associated with targeting criteria satisfied by the selected one or more characteristics;
presenting the display menu to the user;
receiving an input from the user to the option for preventing subsequent presentation of the additional advertisement content associated with targeting criteria satisfied by the selected one or more characteristics; and
in response to the received input, identifying additional ad requests including targeting criteria satisfied by the selected one or more characteristics as ineligible for presentation to the user.

2. The method of claim 1, wherein selecting one or more characteristics of the user satisfying the targeting criteria included in the ad request comprises:
retrieving a ranking of the identified characteristics satisfying the targeting criteria included in the ad request; and
selecting the one or more characteristics based at least in part on the ranking.

3. The method of claim 2, wherein the ranking of the identified characteristics satisfying the targeting criteria is based at least in part on feedback from one or more users of the online system associated with each of the characteristics satisfying the targeting criteria.

4. The method of claim 2, wherein selecting the one or more characteristics based at least in part on the ranking comprises:
selecting a characteristic having a maximum position in the ranking.

5. The method of claim 2, wherein selecting the one or more characteristics based at least in part on the ranking comprises:
selecting one or more characteristics having at least a threshold position in the ranking.

6. The method of claim 1, wherein selecting one or more characteristics of the user satisfying the targeting criteria included in the ad request comprises:
presenting the advertisement content to the user in conjunction with an option for the user to view one or more reasons the advertisement content was presented;
receiving a selection of the option by the user; and
selecting the one or more characteristics of the user satisfying the targeting criteria included in the ad request in response to receiving a selection of the option.

7. The method of claim 1, wherein selecting one or more characteristics of the user satisfying targeting criteria included in the ad request comprises:
determining scores associated with each of the identified characteristics satisfying the targeting criteria included in the ad request; and
selecting the one or more characteristics based at least in part on the determined scores.

8. The method of claim 7, wherein selecting the one or more characteristics based at least in part on the determined scores comprises:
selecting an identified characteristic having a maximum score.

9. The method of claim 7, wherein selecting the one or more characteristics based at least in part on the determined scores comprises:
selecting one or more identified characteristics associated with at least a threshold score.

10. The method of claim 1,
wherein generating a display menu further comprises 3) an additional option to modify characteristics associated with the user compared to targeting criteria included in one or more ad requests, and the method further comprises:
receiving information from the additional option by the user identifying characteristics authorized by the user to be compared to targeting criteria included in one or more ad requests; and
in response to the received information, comparing characteristics authorized by the user with targeting criteria included in one or more ad requests and not comparing characteristics not authorized by the user with targeting criteria included in one or more ad requests to identify advertisement content eligible for presentation to the user.

11. The method of claim 10, wherein the additional option to modify characteristics associated with the user compared to targeting criteria included in one or more ad requests comprises:
presenting one or more additional characteristics to the user for association with the user by the online system; and
storing information associating an additional characteristic with the user in response to the user selecting the additional characteristic.

12. A method comprising:
selecting advertisement content to provide to a user of an online system, the advertisement content associated with one or more targeting criteria satisfied by characteristics associated with the user;
providing the selected advertisement content for display to the user in conjunction with an option for the user to view one or more reasons the selected advertisement content was presented;
receiving a selection of the option by the user;
in response to receiving the selection of the option, selecting one or more characteristics of the user satisfying the targeting criteria associated with the selected advertisement content;
presenting a description of the selected one or more characteristics to the user;
receiving an input from the user to prevent subsequent presentation of additional advertisement content associated with targeting criteria satisfied by the selected one or more characteristics and
storing information preventing comparison of the selected one or more characteristics to targeting criteria associated with additional advertisement content in response to receiving the input from the user.

13. The method of claim 12, wherein selecting one or more characteristics of the user satisfying the targeting criteria associated with the selected advertisement content comprises:
retrieving a ranking of the identified characteristics satisfying the targeting criteria associated with the selected advertisement content; and
selecting the one or more characteristics based at least in part on the ranking.

14. The method of claim 13, wherein the ranking of the identified characteristics satisfying the targeting criteria is based at least in part on feedback from one or more users of the online system associated with each of the characteristics satisfying the targeting criteria.

15. The method of claim 13, wherein selecting the one or more characteristics based at least in part on the ranking comprises:
selecting one or more characteristics having at least a threshold position in the ranking.

16. The method of claim 12, further comprising:
presenting an additional option to modify characteristics associated with the user compared to targeting criteria associated with advertisement content;
presenting characteristics associated with the user in response to receiving a selection of the additional option to modify characteristics associated with the user compared to targeting criteria associated with advertisement content;
receiving information from the user identifying characteristics authorized by the user to be compared to targeting criteria associated with advertisement content; and
comparing characteristics authorized by the user with targeting criteria included in one or more ad requests and not comparing characteristics not authorized by the user with targeting criteria associated with advertisement content to determine content eligible for presentation to the user.

17. The method of claim 16, wherein presenting characteristics associated with the user in response to receiving the selection of the additional option to modify characteristics associated with the user compared to targeting criteria associated with advertisement content comprises:
presenting one or more additional characteristics to the user for association with the user by the online system; and
storing information associating an additional characteristic with the user in response to the user selecting the additional characteristic.

18. A computer program product comprising a non-transitory computer readable storage medium having instructions encoded thereon that, when executed by a processor, cause the processor to:
select advertisement content to a user of an online system, the advertisement content associated with one or more targeting criteria satisfied by characteristics associated with the user;
select one or more characteristics of the user satisfying the targeting criteria associated with the selected advertisement content;
present a description of the selected one or more characteristics to the user;
receive an input from the user to prevent subsequent presentation of additional advertisement content associated with targeting criteria satisfied by the selected one or more characteristics and
store information preventing comparison of the selected one or more characteristics to targeting criteria associated with additional advertisement content in response to receiving the input.

19. The computer program product of claim 18, wherein the computer readable storage medium further has instructions encoded thereon that, when executed by the processor, cause the processor to:
present an option to modify characteristics associated with the user compared to targeting criteria included in one or more ad requests;
present characteristics associated with the user in response to receiving a selection of the option to modify characteristics associated with the user compared to targeting criteria included in one or more ad requests;
receive information from the user identifying characteristics authorized by the user to be compared to targeting criteria included in one or more ad requests; and
compare characteristics authorized by the user with targeting criteria included in one or more ad requests and not comparing characteristics not authorized by the user with targeting criteria included in one or more ad requests to identify advertisement content eligible for presentation to the user.

20. The computer program product of claim 18, wherein select one or more characteristics of the user satisfying the targeting criteria included in the ad request comprises:
present the advertisement content to the user in conjunction with an option for the user to view one or more reasons the advertisement content was presented;
receive a selection of the option by the user; and
select the one or more characteristics of the user satisfying the targeting criteria included in the ad request in response to receiving the selection of the option.

* * * * *